STORING PULSE GENERATORS AND THEIR CONTROL

Filed Dec. 12, 1960 3 Sheets-Sheet 1

INVENTOR
FRANZ J. SCHRAMEL
ANTONIE W. VAN 'T SLOT
BY
Frank R. Jifari
AGENT

Nov. 9, 1965 F. J. SCHRAMEL ETAL 3,217,299

STORING PULSE GENERATORS AND THEIR CONTROL

Filed Dec. 12, 1960 3 Sheets-Sheet 2

INVENTOR
FRANZ J. SCHRAMEL
ANTONIE W. VAN'T SLOT
BY
Frank R. Jifani
AGENT

STORING PULSE GENERATORS AND THEIR CONTROL

Filed Dec. 12, 1960 3 Sheets-Sheet 3

INVENTOR
FRANZ J. SCHRAMEL
ANTONIE W. VAN 'T SLOT
BY
AGENT

United States Patent Office 3,217,299
Patented Nov. 9, 1965

3,217,299

STORING PULSE GENERATORS AND THEIR CONTROL

Franz Josef Schramel and Antonie Wijbe van 't Slot, Hilversum, Netherlands, assignors to North American Philips Company, Inc., New York, N.Y., a corporation of Delaware Filed Dec. 12, 1960, Ser. No. 75,365
Claims priority, application Netherlands, Dec. 15, 1959, 246,464
7 Claims. (Cl. 340—174)

The invention relates to a circuit arrangement comprising two storing pulse generators. The term "storing pulse generator" as used herein is to be understood to mean a circuit arrangement having at least three terminals referred to as set terminal, firing terminal and output terminal, respectively; this arrangement is designed so that it produces an output pulse at its output terminal only if a pulse of a certain polarity and sufficient strength has been applied to the set terminal (the setting of the storing pulse generator) and subsequently a pulse of a certain polarity and sufficient strength has been applied to the firing terminal (the firing of the storing pulse generator). Thus, a pulse generator which has not been set does not produce an output pulse when fired and a pulse generator which has been fired can only produce another output pulse if it is again set. Since there may be an undetermined time interval between the setting and the firing, the pulse generator must have storage properties and hence comprise a storage element. However, the invention is independent of the nature of this storage element and of the nature of the pulses which have to be applied to the firing and set terminals. These pulses may be current pulses or voltage pulses. In the former case, a number of pulse generators can be set or fired in series, in the latter case a number of pulse generators can be set or fired in parallel. The same current or voltage pulse may also be used to set a plurality of pulse generators and to fire a plurality of different pulse generators, this function being performed in series in the case of current pulses and in parallel in the case of voltage pulses. In order not to unduly complicate the drawings, all the circuit diagrams show pulse generators adapted to be set or fired in parallel, even where in actual fact they may be set or fired in series. The wording of the specification is in conformity therewith. Thus, when it is mentioned that one of two pulse generators is set and the other is fired by the same pulse, this means that the pulse generators are set or fired in parallel when using voltage pulses and in series when using current pulses. In both cases it will be stated that the set terminal of one pulse generator is connected to the firing terminal of the other pulse generator.

As has been stated hereinbefore, the invention is independent of the nature of the pulse generator, S. S. Guterman and W. M. Carey, Jr., in Convention Record of the I.R.E. 3, number 4 (1955), pages 84–94, in an article entitled, A Transistor Magnetic Core Circuit; a New Device Applied to Digital Computing Techniques, describe a storing pulse generator the storage element of which is a ring of magnetic material having a square hysteresis loop, amplification being provided by a transistor. This pulse generator must be set and fired by current pulses and produces a current pulse as the output pulse; it can keep the information stored in it for an indefinitely long period of time. Furthermore, it has the property, inherent to magnetic rings having a square hysteresis loop, of being capable of being set in twofold or threefold coincidence. For this purpose, the pulse generator must have two or three set terminals which are referred to as "coupled." A storing pulse generator may alternatively have a number of uncoupled set terminals, in which event it may be set by applying a pulse to any of the set terminals.

The circuit arrangement in accordance with the invention is characterized in that it comprises two pulse generators the first of which has two coupled set terminals; one of these set terminals is connected to the output terminal of the second pulse generator and the other to the firing terminal of the second pulse generator. The first pulse generator is set by the coincidence of the output pulse of the second pulse generator and the pulse which fired said second pulse generator, while the first pulse generator remains unset when only the output pulse delivered by the second pulse generator is present.

The circuit arrangement in accordance with the invention and some applications thereof will now be described more fully with reference to the drawing. Although in these circuit arrangements any storing pulse generator may be used, for convenience it is assumed that use is made in the examples of the pulse generator described in the above mentioned article.

Figure 1:
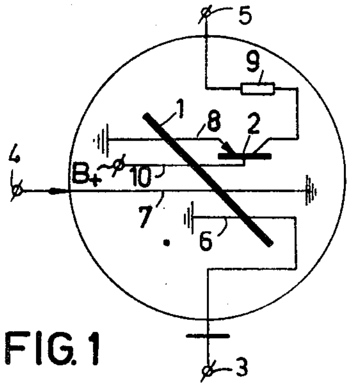
FIGURE 1 shows the circuit diagram of a storing pulse generator with the symbol used therefor.

FIGURE 1 shows a storing pulse generator as described in the above-mentioned article comprising a ring 1 of a magnetic material having a square hysteresis loop as the storage element and a transistor 2 as the amplifier element. In FIG. 1, a set terminal is designated 3, a firing terminal 4 and an output terminal 5. To these three terminals are respectively connected a set winding 6, a firing winding 7 and the collector of the transistor 2, the emitter of which is connected to a feedback winding 8 provided on the ring 1. The output circuit of the pulse generator may include a current-limiting resistor 9. Finally the pulse generator contains a control winding 10 one end of which is connected to the base of the transistor 2 while the other end is connected to a voltage source $B_+$ which has a value such that the transistor is cut off. For a PNP-transistor this is a low positive voltage. In FIG. 1, the ring is shown as a heavy line and the windings as lines intersecting this heavy line. This representation has the advantage that it clearly shows the winding senses. In actual fact, the winding may have more than one turn.

The circuit arrangement operates as follows. By setting the pulse generator (by applying a pulse to set terminal 3), the ring 1 is set to a condition referred to as state 1. Subsequent firing of the pulse generator (by applying a pulse to firing terminal 4) results in the ring commencing to shift to the state 0. As a result, a voltage is induced in the control winding 10 and the arrangement is designed so that this voltage when applied to the base of the transistor 2 renders the transistor conductive. Consequently, current begins to flow through the feedback winding 8 whose winding sense is such that this current also drives the ring 1 to the state 0. This current persists until the instant at which the ring 1 has reached this state even if the firing pulse has already ceased before this instant. The current passing through the feedback winding 8 takes over the effect of the current flowing through the firing winding 7 so that a voltage keeps being induced in the control winding 10 and hence the transistor 2 remains conductive as long as the ring 1 is changing states. Once the state 0 is attained, the pulse generator is set at rest, i.e., the pulse stops. The arrangement may be proportioned so that the pulse generator produces substantially square current pulses of specified current strength and duration.

Figure 2:
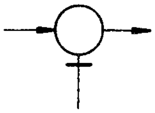
FIGURES 2 to 7 show the symbols used for a few types of storing pulse generators.
Figure 3:
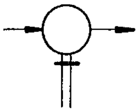
Figure 4:
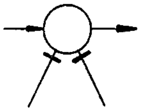
Figure 5:
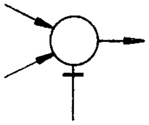
Figure 6:
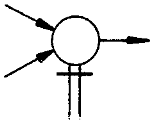
Figure 7:
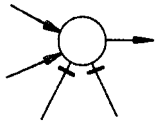

FIGURE 2 shows the symbol used for a storing pulse generator. The set terminal is indicated by a cross-line, the firing terminal by an arrow pointing to the circle representing the pulse generator and the output terminal by an arrow pointing away from said circle. FIGURE 3 shows the symbol for a pulse generator having two coupled set terminals. Hence, this pulse generator requires two set windings each having a number of turns which is one half of that of the set winding for a pulse generator having one set terminal. FIGURE 4 shows the symbol for a pulse generator having two uncoupled set terminals. FIGURE 5 shows the symbol for a pulse generator having two (uncoupled) firing terminals. Finally, FIGURES 6 and 7 show the symbols for pulse generators having two set terminals and two (uncoupled) firing terminals, the set terminals of the pulse generator shown in FIGURE 6 being coupled and those of the pulse generator shown in FIGURE 7 being uncoupled.

Figures 8, 9, 10:
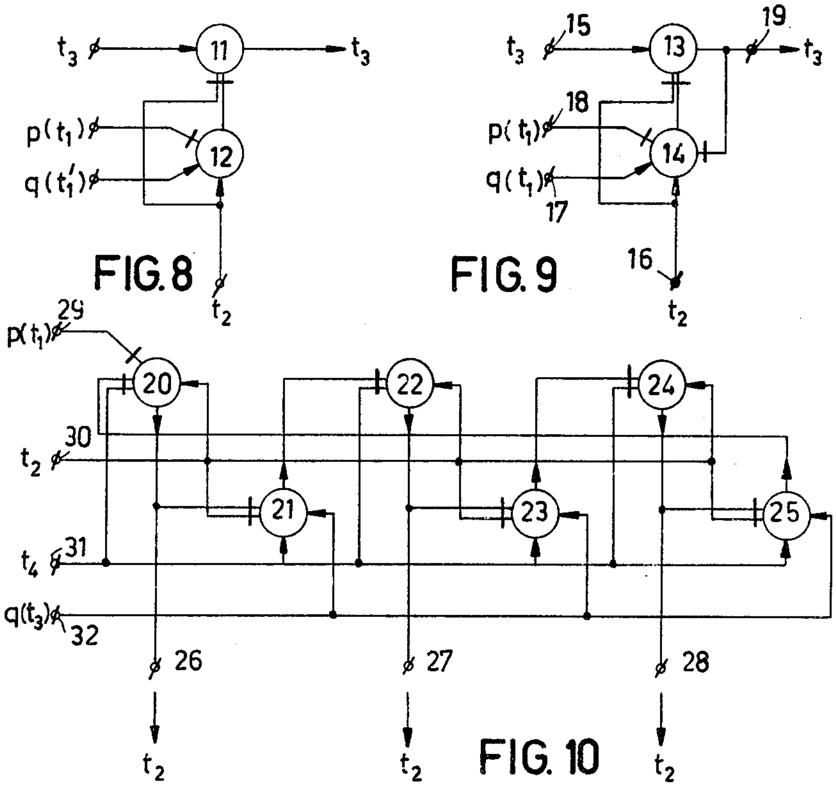
FIGURE 8 shows the circuit arrangement wherein two storing pulse generators are used in accordance with the invention.
FIGURE 9 shows the circuit diagram of a controllable pulse gate in conjunction with a circuit arrangement in accordance with the invention.
FIGURES 10 and 11 show the circuit diagrams of two circulating shift registers.

FIGURE 8 shows a circuit arrangement in accordance with the invention. It comprises a first storing pulse generator 11 with two coupled set terminals and a second storing pulse generator 12 with one set terminal. One of the two coupled set terminals of the first pulse generator 11 is connected in series with the firing terminal of the second pulse generator 12 and the other coupled set terminal of the first generator is connected to the output terminal of the second pulse generator 12.

This circuit arrangement operates as follows. It is assumed that the pulse generator 12 is set by a pulse $p$ at an instant $t_1$. If at a subsequent instant $t_2$ a pulse is applied to the series-combination of the firing terminal of the pulse generator 12 and one set terminal of the pulse generator 11, a pulse is also applied to the other set terminal of the pulse generator 11 since the pulse generator 12 (which was set by pulse $p$ at instant $t_1$) delivers an output pulse. Consequently there is coincidence and the pulse generator 11 is completely set. However, the arrangement is such that the pulse generator 11 cannot be completely set (magnetic ring in state 1) solely by the output pulse of the pulse generator 12. If now at a still later instant $t_3$ the pulse generator 11 is fired, this generator will also deliver an output pulse. If a pulse is applied at the instant $t_2$ without the pulse generator 12 having previously been set, the pulse generator 11 will not be in the set condition and consequently delivers no output pulse if it is subsequently fired at the instant $t_3$. Thus, the circuit arrangement delivers an output pulse only if a pulse $p$ is applied at an instant $t_1$ and subsequently pulses are applied at instants $t_2$ and $t_3$. The circuit arrangement is in this sense comparable with a coincidence circuit; the difference with respect to a coincidence circuit, however, is that the pulses must occur not simultaneously but in a predetermined sequence. The effect of the pulse $p$ at the instant $t_1$ may be counteracted by firing the pulse generator 12 at an instant $t_1'$ between the instants $t_1$ and $t_2$ by means of a pulse $q$. The pulse delivered in this event by the pulse generator 12, indeed, cannot set the pulse generator 11, since there is no coincidence. As a result, the pulse generator 11 does not deliver an output pulse at the instant $t_3$.

FIGURE 9 shows the circuit arrangement of a controllable pulse gate in which the principle of a storing pulse generator according to the invention is used. The difference from the circuit arrangement shown in FIGURE 8 is that the output circuit of a first pulse generator 13 (corresponding to the pulse generator 11 of FIGURE 8) is connected in series with a second set winding of a second pulse generator 14 (corresponding to the pulse generator 12 of FIGURE 8), said second set winding not being coupled to the first set winding of the second pulse generator. The firing winding of the first pulse generator 13 is connected to a terminal 15, the first and second firing terminals and the first set winding of the pulse generator 14 are connected to terminals 16, 17 and 18, respectively, and the output circuit of the pulse generator 13 is connected to an output terminal 19.

The circuit arrangement of FIG. 9 operates as follows. It is assumed that the two pulse generators 13 and 14 are both in the unset condition and that, at instants $t_2$ and $t_3$ of periodic pulse cycles, pulses are applied to the terminals 16 and 15 but no pulses are applied to the terminals 17 and 18. The pulse generator 14 now delivers no output pulses since it is in the unset condition and the pulse generator 13 cannot be placed in the set condition because there is no coincidence at its two coupled set terminals. Hence, pulse generator 13 cannot deliver output pulses either. Thus, the circuit arrangement does not pass the pulses applied to the terminal 15, i.e., the pulse gate is closed.

It is now assumed that a single pulse $p$ is applied to the terminal 18 at the instant $t_1$ of a pulse cycle. As a result, the pulse generator 14 is placed in the set condition and hence at the subsequent instant $t_2$ delivers an output pulse so that the pulse generator 13 is placed in the set condition (since there is coincidence at its two coupled set terminals). At the next instant $t_3$ the pulse generator 13 consequently delivers an output pulse which, apart from any further functions, resets the pulse generator 14 to the set condition. This cycle is then repeated, in other words, the pulse gate now is open and passes and amplifies the pulses applied to the terminal 15.

However, if after some time at the instant $t_1$ of a pulse cycle a non-recurrent pulse $q$ is applied to the terminal 17, the pulse generator 14 is fired and hence is placed in the unset condition. However, the output pulse delivered by this pulse generator cannot place the unset pulse generator 13 to the cocked condition since there is no coincidence at its two coupled set terminals. Consequently the pulse gate is again closed. Thus, the pulses $p$ and $q$, which may occur from time to time at instants $t_1$ of certain pulse cycles, act as an opening signal and a closing signal.

FIGURE 10 shows the circuit diagram of a circulating shift or counting register comprising a ring consisting of six storing pulse generators 20, 21, 22, 23, 24 and 25, each pulse generator being set by the preceding one in the manner shown in FIGURE 8. The pulse generators 20, 22 and 24 are fired by the same pulse applied to a terminal 30 and similarly the pulse generators 21, 23 and 25 are fired by a pulse applied to a terminal 31. In addition, the pulse generators 21, 23 and 25 can be fired independently by a pulse applied to a terminal 32 while the pulse generator 20 can be set by a pulse applied to a terminal 29. It is assumed that at each instant $t_2$ of recurrent pulse cycles a pulse is applied to the terminal 30 and that at each instant $t_4$ of these pulse cycles a pulse is applied to the terminal 31. At the instant $t_1$ of a pulse cycle a non-recurrent pulse $p$ can be applied to the terminal 29 and at the instant $t_3$ of a pulse cycle a non-recurrent pulse $q$ can be applied to the terminal 32. The outputs of the pulse generators 20, 22 and 24 are connected to output terminals 26, 27 and 28.

The circuit arrangement of FIG. 10 operates as follows. If all the pulse generators are in the unset condition, the pulses applied to the terminals 30 and 31 have no effect since they cannot cause an output pulse to be produced or a pulse generator to be placed in the set condition. No output pulse can be produced since all the pulse generators are unset and a pulse generator cannot be set since there is no coincidence due to the absence of output pulses. It is assumed that now at the instant $t_1$ of a pulse cycle a non-recurrent pulse $p$ is applied to the terminal 29. This pulse places the pulse generator 20 in the set condition. At the subsequent instant $t_2$ this pulse generator consequently delivers an output pulse and the pulse generator 21 is set. At the subsequent instant $t_4$ the pulse generator 21 delivers an output pulse and the pulse generator 22 is set. At the next instant $t_2$, the pulse generator 22 delivers an output pulse and the pulse generator 23 is set, and so on. Thus, at the instants $t_2$ of the pulse cycles, pulses are produced at the output terminals in the sequence 26, 27, 28, 26, 27, 28, 26 . . . . Hence, the pulse $p$ has started the shift or counting register. The shift register can be stopped by applying a non-recurrent pulse $q$ to the terminal 32 at the instant $t_3$ of a pulse cycle. As a result, the pulse generators 21, 23 and 25 are fired and are then in the unset condition in as far as they were not in this condition already. Due to the absence of coincidence, however, none of the pulse generators 20, 22 and 24, which are unset at this instant, can be placed in the set condition so that all the pulse generators now are unset. Thus, the pulse $q$ has stopped the shift register. However, it is important to note that the pulse $p$ has to occur at the instant $t_1$ of a pulse cycle (at least between the instant $t_4$ of a pulse cycle and the instant $t_2$ of the next pulse cycle) and the pulse $q$ has to occur at the instant $t_3$ of a pulse cycle (at least between the instants $t_1$ and $t_4$ of a same pulse cycle) if they are to act as start and stop signal respectively.

Figures 11, 12:
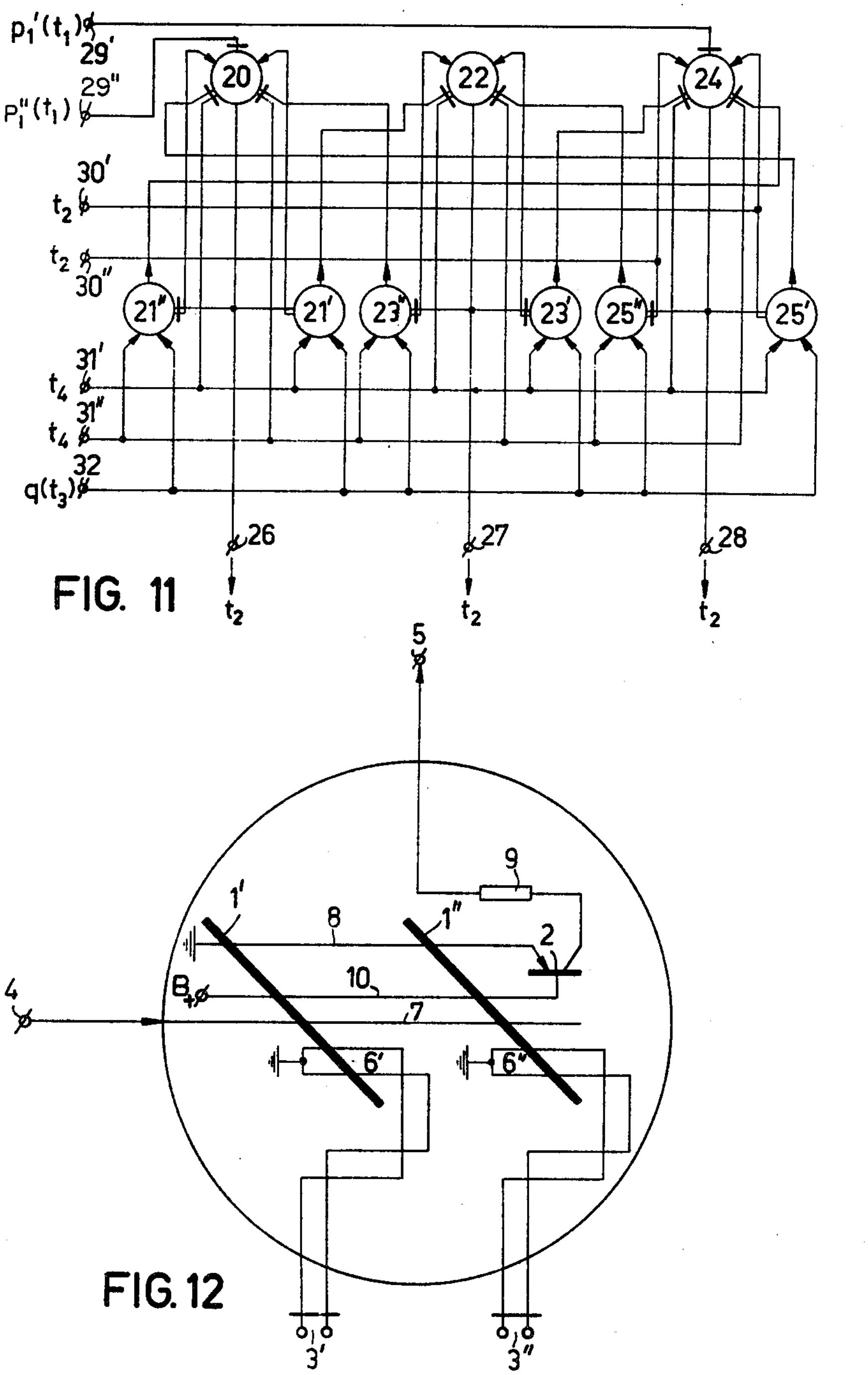
FIGURE 12 is a circuit diagram of a storing pulse generator composed in part of components similar to those of FIGURE 1.

FIGURE 11 shows a circulating shift register adapted to operate both forward (pulses being applied in the sequence 26, 27, 28, 26, 27, 28, 26 . . .) and backward (pulses being applied in the sequence 26, 28, 27, 26, 28, 27, 26 . . .). This shift register may be considered as two dovetailed shift registers of the type shown in FIGURE 10, one being used for forward operation and the other for backward operation with the two shift registers having the storing pulse generators 20, 22 and 24 in common. In FIGURE 11, components analogous to those of FIGURE 10 are designated by the same reference numerals; however, the reference numerals of components serving solely for forward operation are provided with one accent and the reference numerals of components serving solely for backward operation are provided with two accents.

The common use of components may be carried still further, the pairs of pulse generators 21′/25″, 23′/21″, 25′/23″ being combined to form units each having two magnetic rings but one common transistor. Thus, pulse generators are obtained of the kind shown by the circuit diagram of FIGURE 12, in which components analogous to those of the pulse generator shown in FIGURE 1 are designated by the same reference numerals; however, if they occur in pairs, they are provided with one and two accents respectively. Thus, a pulse generator is obtained having two pairs of coupled set terminals 3′ and 3″. The pulse generator can be placed in the set condition by two coincident pulses applied either to the pair of set terminals 3′ or to the pair of set terminals 3″. Coincidence of a pulse applied to one of the terminals 3′ and of a pulse applied to one of the terminals 3″, however, does not place the pulse generator in the set condition.

Figure 13:
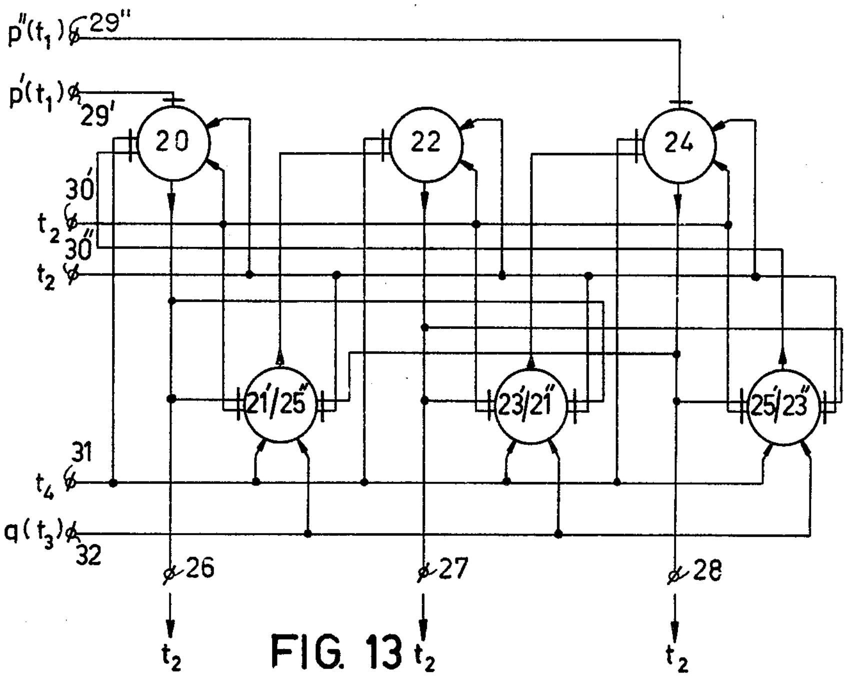
FIGURE 13 is a circuit diagram of a shift register composed of pulse generators of the type shown in FIG. 12.

When using pulse generators of the kind shown in FIGURE 12, the circuit diagram of a shift register for forward and backward operation will be as shown in FIGURE 13.

In the circuit arrangements shown in FIGURES 10, 11 and 13 each two successive pulse generators are connected in the manner shown in FIGURE 8. As an alternative, however, only half of the pairs of successive pulse generators may be connected in this manner, the other half being coupled without coincidence. Thus, in the circuit arrangement of FIGURE 10, the pulse generators 20, 22 and 24 may be coupled to the pulse generators 21, 23 and 25 respectively without coincidence, whereas the pulse generators 21, 23 and 25 are coupled to the pulse generators 22, 24 and 20 with coincidence.

Figure 14:
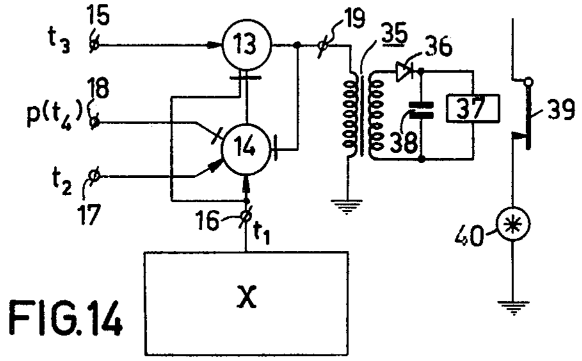
FIGURES 14 and 15 are circuit diagrams of embodiments in which the pulse gate of FIG. 9 is used as a supervision circuit.

Finally, it should be pointed out that the pulse gate shown in FIGURE 9 may be used to great advantage for supervising another circuit. Referring to FIG. 14, it is assumed that X is an apparatus which in normal operation delivers pulses at instants $t_1$ of pulse cycles. These pulses are applied to a terminal 16 of the pulse gate while, at instants $t_2$ of the pulse cycles, pulses are applied to a terminal 17 and, at instants $t_3$ of the pulse cycles, pulses are applied to a terminal 15. The pulse gate is opened by applying a non-recurrent pulse $p$ to a terminal 18 at an instant $t_4$ of a pulse cycle. Thus, the output terminal 19 of the pulse gate delivers an output pulse at each instant $t_3$. The pulses applied to the terminal 17 have no effect since the pulse generator 14 is in the unset condition at these instants. The pulses delivered by the pulse gate at the instants $t_3$ are applied through a transformer 35 to a diode 36 by which they are rectified. The resulting pulsating direct current is supplied to the winding of a relay 37 shunted by a capacitor 38, a break contact 39 of this relay being connected in the circuit of an alarm device 40. With normal operation of the apparatus X, the pulse gate is open, the relay 37 is energized and the contact 39 is opened. If, however, a pulse of the apparatus X fails to appear, at the next instant $t_2$ the pulse generator 14 is fired but the pulse delivered as a result by this generator does not place the pulse generator 13 in the set condition. Consequently, the pulse gate is closed, the relay 37 releases and the circuit of the alarm device 40 is completed through the break contact 39 in the closed position.

Figure 15:
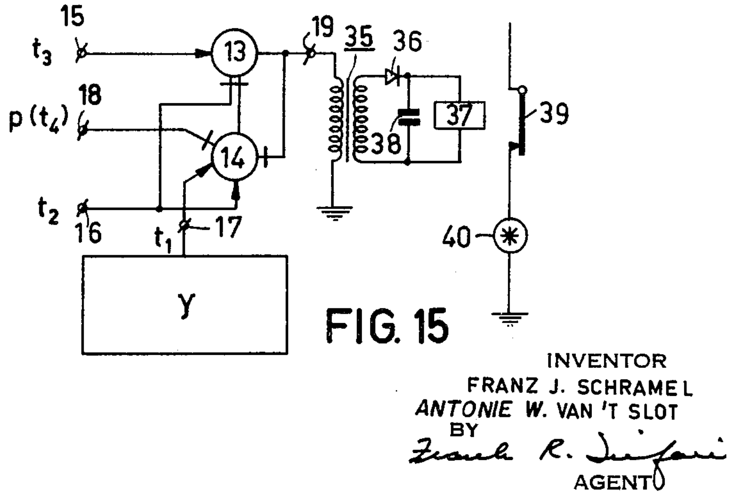

In FIGURE 15, Y represents an apparatus which in the case of incorrect operation delivers a non-recurrent pulse at an instant $t_1$ of a pulse cycle. This pulse is applied to a terminal 17 of the pulse gate while, at instants $t_2$ of the pulse cycles, pulses are applied to a terminal 16. The remainder of the circuit arrangement is the same as that of FIGURE 14. If the pulse gate is opened by the application of a non-recurrent pulse to a terminal 18 at an instant $t_4$, the relay 37 remains energized and the break contact 39 in the circuit of the device 40 remains open. If, however, at an instant $t_1$ of a pulse cycle the device Y has delivered a non-recurrent pulse, the pulse gate is closed, the relay 37 releases and the break contact in the circuit of the device 40 is closed.

While the invention has been described with respect to specific embodiments, many modifications thereof will readily occur to those having ordinary skill in the art, such modifications being within the inventive concept as defined in the appended claims.

What is claimed is:

1. A circuit arrangement for deriving an output pulse in response to the application of a plurality of input pulses applied sequentially, comprising: first and second storing pulse generators each having at least one set terminal, at least one firing terminal and one output terminal, said first generator having two coupled set terminals one of which is solely connected to the output terminal of the second generator and having applied thereto pulses produced at said output terminal and the other of which is solely connected to one firing terminal of the second generator and having applied thereto pulses applied to said one firing terminal, said first generator being set only by the coincident application at its coupled set terminals of a pulse from the output terminal of the second generator and a pulse applied to said one firing terminal of the second generator and remaining unset in the absence of such coincident application, whereby an output pulse is derived from the output terminal of the first generator only if first a pulse is applied to a set terminal of the second generator, then a pulse is applied to said one firing terminal of the second generator, and then a pulse is applied to a firing terminal of the first generator.

2. A circuit arrangement for deriving an output pulse in response to the application of a plurality of input pulses applied sequentially, comprising: a first storing pulse generator having a firing terminal, a pair of coupled set terminals and an output terminal, a second storing pulse generator, having a set terminal, two firing terminals and one output terminal, one of the coupled set terminals of said first generator being connected to the output terminal of the second generator and having applied thereto pulses produced at said output terminal and the other of said coupled set terminals being solely connected to one firing terminal of the second generator and having applied thereto pulses applied to said one firing terminal, said first generator being set only by the coincident application at its coupled set terminals of a pulse from the output terminal of the second generator and a pulse applied to said one firing terminal of the second generator and remaining unset in the absence of such coincident application, whereby an output pulse is derived from the output terminal of the first generator only if first a pulse is applied to a set terminal of the second generator, then a pulse is applied to said one firing terminal of the second generator, and then a pulse is applied to the firing terminal of the first generator.

3. A controllable pulse gate for deriving an output pulse in response to the application of a plurality of input pulses applied sequentially, comprising: a first storing pulse generator having a firing terminal, a pair of coupled set terminals and an output terminal, a second storing pulse generator having first and second set terminals, two firing terminals and one output terminal, one of the coupled set terminals of said first generator being connected to the output terminal of the second generator and having applied thereto pulses produced at said output terminal and the other of said coupled set terminals being solely connected to one firing terminal of the second generator and having applied thereto pulses applied to said one firing terminal, the second of the set terminals of the second generator being solely connected to the output terminal of the first generator, said first generator being set only by the coincident application at its coupled set terminals of a pulse from the output terminal of the second generator and a pulse applied to said one firing terminal of the second generator and remaining unset in the absence of such coincident application, whereby an output pulse is derived from the output terminal of the first generator only if first a pulse is applied to the first set terminal of the second generator, then a pulse is applied to said one firing terminal of the second generator, and then a pulse is applied to the firing terminal of the first generator, and no output pulse is derived from the output terminal of the first generator if first a pulse is applied to the other firing terminal of the second generator, then a pulse is applied to said one firing terminal of the second generator, and then a pulse is applied to the firing terminal of the first generator.

4. A shift register including a plurality of stages, each stage comprising a main and an auxiliary storing pulse generator each having two coupled set terminals, at least one firing terminal and one output terminal, one of the set terminals of each auxiliary generator in a stage being connected to the output terminal of the main pulse generator in that stage, one of the set terminals of each main generator in a stage being connected to the output terminal of the auxiliary pulse generator of the preceding stage, at least one of the main pulse generators having an additional set terminal, a first supply terminal connected to the firing terminals of all of the main pulse generators, a second supply terminal connected to the firing terminals of all of the auxiliary pulse generators, and means for applying pulses to said additional set terminal and said first and second supply terminals.

5. A shift register including a plurality of stages, each stage comprising a main and an auxiliary storing pulse generator each having two coupled set terminals, at least one firing terminal and one output terminal, one of the set terminals of each auxiliary generator in a stage being connected to the output terminal of the main pulse generator in that stage, one of the set terminals of each main generator in a stage being connected to the output terminal of the auxiliary pulse generator of the preceding stage, all of said main pulse generators having an additional set terminal connected to a control terminal, a first supply terminal connected to the firing terminals of all of the main pulse generators, a second supply terminal connected to the firing terminals of all of the auxiliary pulse generators, and means for applying pulses to said control terminal and said first and second supply terminals.

6. A shift register including a plurality of stages, each stage comprising a main and an auxiliary storing pulse generator each having two coupled set terminals, at least one firing terminal and one output terminal, one of the set terminals of each auxiliary generator in a stage being connected to the output terminal of the main pulse generator in that stage, one of the set terminals of each main generator in a stage being connected to the output terminal of the auxiliary pulse generator of the preceding stage, all of said auxiliary pulse generators having an additional set terminal connected to a control terminal, a first supply terminal connected to the firing terminals of all of the main pulse generators, a second supply terminal connected to the firing terminals of all of the auxiliary pulse generators, and means for applying pulses to said control terminal and said first and second supply terminals.

7. A circuit for detecting the absence of a pulse in a pulse train, comprising: a first storing pulse generator having a firing terminal, a pair of coupled set terminals and an output terminal, a second storing pulse generator having first and second set terminals, two firing terminals and one output terminal, one of the coupled set terminals of said first generator being connected to the output terminal of the second generator and having applied thereto pulses produced at said output terminal and the other of said coupled set terminals being solely connected to one firing terminal of the second generator and having applied thereto pulses applied to said one firing terminal, the second of the set terminals of the second generator being solely connected to the output terminal of the first generator, said first generator being set only by the coincident application at its coupled set terminals of a pulse from the output terminal of the second generator and a pulse applied to said one firing terminal of the second generator and remaining unset in the absence of such coincident application, means for first applying a pulse of said pulse train to the first firing terminal of the second pulse generator, means for subsequently applying a pulse to the second firing terminal of the second pulse generator, and means for subsequently applying a pulse to a firing terminal of the first pulse generator.

References Cited by the Examiner

UNITED STATES PATENTS

| | | | |
|---|---|---|---|
| 2,785,390 | 3/57 | Rajchman | 328—37 |
| 2,846,667 | 8/58 | Goodell | 307—88 X |
| 2,994,788 | 8/61 | Clark | 307—88 |
| 3,017,084 | 1/62 | Guterman | 307—88 X |

IRVING L. SRAGOW, *Primary Examiner.*

J. W. HUCKERT, *Examiner.*

UNITED STATES PATENT OFFICE
CERTIFICATE OF CORRECTION

Patent No. 3,217,299 November 9,1965

Franz Josef Schramel et al.

It is hereby certified that error appears in the above numbered patent requiring correction and that the said Letters Patent should read as corrected below.

Column 4, line 47, for "cocked" read -- set --.

Signed and sealed this 19th day of July 1966.

(SEAL)
Attest:

ERNEST W. SWIDER
Attesting Officer

EDWARD J. BRENNER
Commissioner of Patents